Oct. 27, 1970 J. W. MUELLER 3,535,759
MILLING CUTTER WITH ADJUSTABLE CUTTING INSERT BITS
Filed April 12, 1968 2 Sheets-Sheet 1
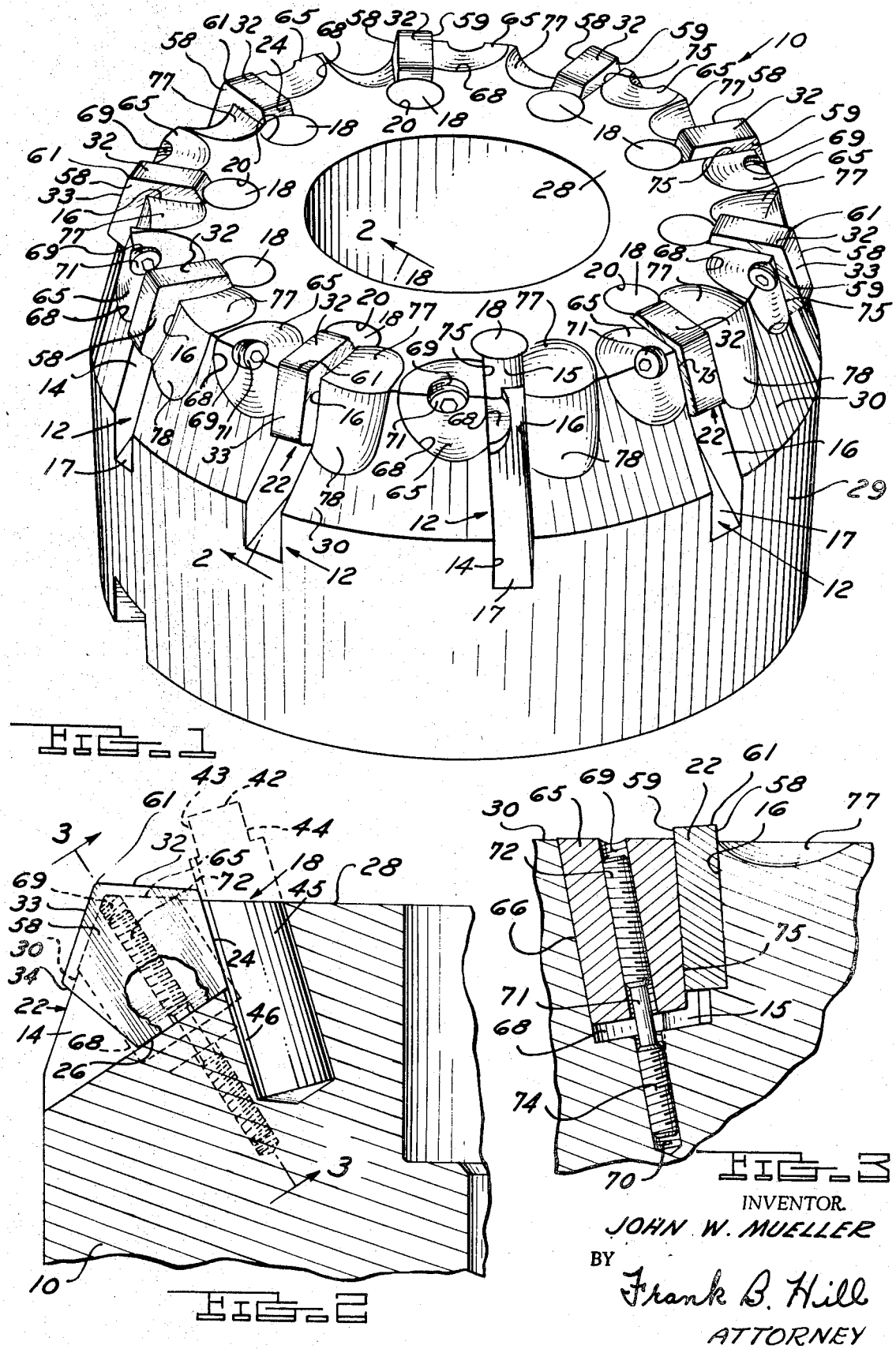
FIG. 1
FIG. 2
FIG. 3
INVENTOR.
JOHN W. MUELLER
BY
ATTORNEY

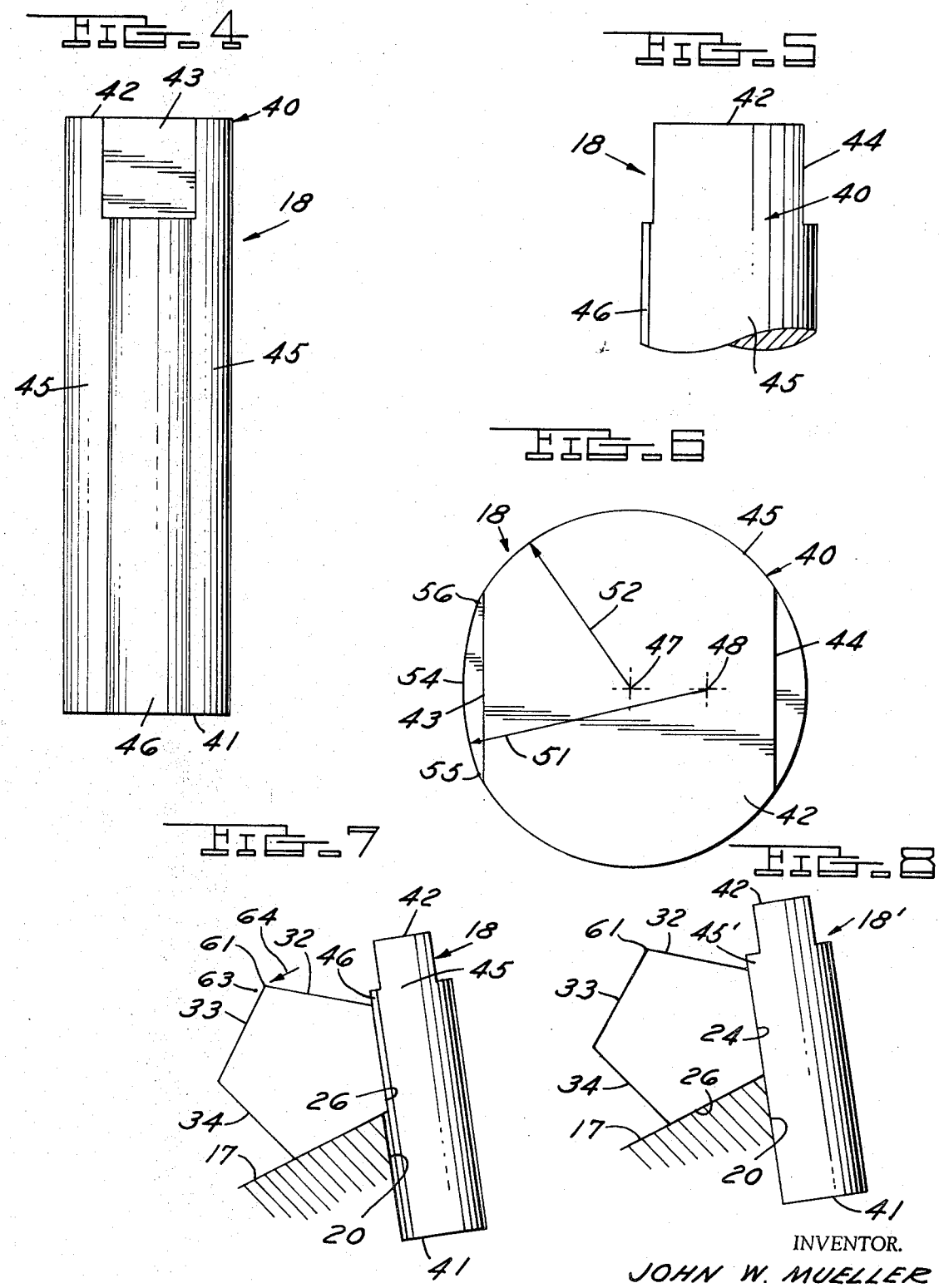

United States Patent Office
3,535,759
Patented Oct. 27, 1970

1

3,535,759
MILLING CUTTER WITH ADJUSTABLE
CUTTING INSERT BITS
John W. Mueller, Southfield, Mich., assignor to Willey's
Carbide Tool Company, Dearborn, Mich.
Filed Apr. 12, 1968, Ser. No. 720,957
Int. Cl. B26d 1/12
U.S. Cl. 29—105                                      7 Claims

ABSTRACT OF THE DISCLOSURE

This invention relates to a milling cutter having removable indexable cutting insert bits where the bits are located by a single dowel type locating pin having a cam surface and a solid bottom surface permitting precise locating of the cutting surfaces of the indexable cutting insert bit by adjusting the cam surface to position the cutting surfaces over a predetermined range along the solid bottom surface.

---

This invention relates generally to milling cutters of the removable indexable cutting insert type located by a predetermined slot bottom surface and a locating pin, and in its specific embodiment to a single locating pin having an adjustment surface and a precision bottom surface which act in conjunction to precisionly position the removable cutting insert over a predetermined range of cutting positions.

Indexable cutting inserts for use with milling cutters and other tooling arrangements have become quite popular in the machining industry. An example of the present milling cutters having indexable cutting inserts which have been accepted by the tooling industry are illustrated in U.S. Pat. 3,163,920 which issued Jan. 5, 1965 and in a co-pending patent application having Ser. No. 720,173 which was filed Apr. 10, 1968, both of which are owned by the assignee of this present application. This type of milling cutter has proved to be quite successful in application and has made a significant contribution to the advancement of the milling cutter art.

The present invention is an improvement on this milling cutter art and provides for the cutting insert blades to be solidly positioned on a predetermined solid bottom surface and a solid locating pin is provided between the center of the milling cutter and the cutting insert to precisely locate the cutting insert along the precision predetermined bottom surface portion. This arrangement has proved to be of material help in providing quick setup, accurate positioning and rugged cutting in a variety of operations. Therefore, it is an objective of the present invention to provide a single solid locating pin to position a removable cutting insert along a predetermined bottom member of a receiving slot.

It is a further objective of the present invention to provide a solid locating pin having an adjustable surface to selectively locate an indexable cutting insert along a predetermined bottom member.

Another object of the present invention is to provide a locating pin having a cam surface as its adjustable surface which can precisely locate the cutting insert over a desired range of predetermined cutting locations along the bottom portion.

To the accomplishment of the foregoing and related ends, the invention then consists of the means hereinafter fully described and particularly pointed out in the claims, the annexed drawings and the following description set forth in detail on the means of carrying out the invention, such disposed means illustrating, however, but one of the various ways in which the principle of the present invention can be used.

In the annexed drawings:

2

FIG. 1 is a perspective view illustrating the principles of the present invention in conjunction with a milling cutter having a series of cutting insert slots positioning indexable removable cutting inserts around the outer periphery of the body member of the milling cutter, with one cutting insert removed to better illustrate important structural details thereof.

FIG. 2 is a partial sectional view of a milling cutter showing an indexable removable cutting insert positioned in a cutting insert slot and illustrating the principles of the present invention, taken substantially along a line 2—2 and looking in the direction of its arrows of FIG. 1.

FIG. 3 is a partial sectional view of a portion of the locating means and the securing means used in conjunction to position the indexable rotatable cutting insert in a cutting insert slot and illustrating the principles of the present invention, taken substantially along line 3—3 and looking in the direction of its arrows of FIG. 2.

FIG. 4 is a front plane view of the preferred locating pin which has an adjustable locating external surface and illustrates a portion of the locating and adjusting features of the present invention.

FIG. 5 is a partial side view showing the top portion of the preferred locating pin shown in FIG. 4 illustrating portions of the adjustable locating principle of the present invention.

FIG. 6 is a top plan view of the adjustable locating external surface shown in FIGS. 4 and 5 illustrating portions of the present invention and showing the means of generating the adjustable portion of the locating pin in a cam form.

FIG. 7 is a partial sectional view similar to FIG. 2 showing the adjustable and positioning principles of the present invention and illustrating the predetermined range of cutting positions along the solid bottom wall of the cutting insert slot.

FIG. 8 is a partial sectional view similar to FIG. 7 illustrating a non-adjustable solid locating pin working in conjunction with the solid bottom surface of the cutting insert slot to locate the indexable removable cutting insert at a predetermined precise cutting position.

Referring to FIGS. 1 through 3, a milling cutter is disclosed having a disc shaped rotatable body member generally referred to as number 10. Body member 10 is provided with a plurality of substantially positioned radial cutting insert slots 12 disposed at acute angles to their radii of the rotatable body member 10 so that the end of the slot 12 toward the center of the body member 10 is located ahead of to lead the end of the slot 12 near the outer periphery of the body member 10.

The individual cutting insert slots 12 are provided with two substantially parallel side walls 14 and 16, one end portion or end wall 15 and a locating bottom surface 17. The end wall 15 defines a portion of the outer surface of a locating pin 18 which is press fitted and set in an angularly disposed bore 20 which is provided in the body member 10 as best viewed in FIG. 2.

The bore 20 is substantially co-planar with the cutting insert slot 12 and angularly disposed from the locating bottom surface 17. The disposed angular relationship between the bore 20 and the locating bottom surface 17 is dependent upon the geometric shape of the indexable carbide bit or the like which is normally disposed in edge slot 12 and referred to here as a cutting insert 22. The cutting insert 22 when positioned in the cutting insert slot 12 provides for two angularly disposed consecutive locating surfaces 24 and 26.

The rotatable body member 10 has a face or end surface 28, a side surface 29 and an angular surface 30 which connects the face surface 28 and the side surface 29. The cutting insert 22 as illustrated in the present invention is provided with cutting surfaces 32 and 33 and a free surface 34 which connects cutting surface 33 and locating surface 26 as viewed in FIGS. 2 and 7, for example. The cutting edges 32 and 33 are projected above the face surface 28 and the angular surface 30, respectively, in the present illustration, to permit a cutting action in a manner well known in the machine tool art.

The preferred embodiment as shown in FIGS. 1 through 7 illustrates the principles of the present invention in reference to a cutting insert 22 which is shown as a pentagon shaped indexable cutting insert bit which could be made of various cutting materials such as; for example, the hard carbides. When a pentagon shaped cutting insert 22 is utilized, the axial angle between the axial bore 20 and the locating bottom surface 17 is substantially at a 72° angle and is generally referred to by number 36 as viewed in FIG. 7, for example.

The cutting surface 32 has a cutting action generated by its leading edge which is the edge towards side wall 16 and as explained above, this edge projects a short distance above the face surface 28 of the body member 10. The cutting surface 32 in the present illustration is disposed in a plane not parallel with the plane of the face surface 28 but is preferably on an angular relationship with the face surface 32 in the order of 2° to 4° as viewed in FIG. 2 so that the end of the cutting surface 32 furthest from the center of the rotatable body 10 projects higher form face surface 28 than the end of the cutting surface 32 nearer than the center of the rotatable body 10 projects from face surface 28.

Another angular relationship is established between cutting surface 32 and face surface 28, because the side wall 14 is angularly disposed from the face surface 28 to provide for the cutting surface 32 to have an angular relationship to the face surface 28 in the direction to the left, as viewed in FIG. 3, in the order of 5°. When the milling cutter body member 10 is rotated in a counterclockwise direction as viewed in FIG. 1, the angular relationship provides for negative cutting angles in this position.

As hereinbefore mentioned, the cutting insert slots 12, although generally radially disposed relative to the body member 10, are preferably inclined in an angular position in relation to the true radius of the milling cutter body member 10 in such a way that the end of the cutting surface 32 of the cutting insert 22 closer to the center of the body member 10 is the leading edge or ahead of the end of the cutting surface 32 disposed further from the center of body member 10 and closer to its side surface 29. This angle may be; for example, in the order of 8° resulting in the cutting edge of cutting surface 32 of the cutting insert 22 being disposed at a negative cutting angle when the rotatable body member 10 is rotated in the counterclockwise direction mentioned above.

The locating pin 18 in the preferred embodiment illustrated in FIGS. 1 through 7 has an adjustable feature and its elements and their functions will be discussed in detail as viewed in FIGS. 4, 5 and 6 to more clearly point out its adjustable action on the cutting insert 22 to position it along the locating bottom surface 17 at various cutting positions as desired.

The adjustable locating pin 18 has a body portion 40 having a bottom end 41 and an adjusting top end 42. The adjusting top end 42 has adjusting flats 43 and 44 extending along a section of the body portion 40 substantially parallel and 180° out of phase with each other.

The body portion 40 has an external surface which includes a pin surface 45 and a cam surface 46. The pin and cam surfaces 45 and 46 are partial cylindrical outer walls and are connected to each other as best viewed in FIG. 6. The pin surface 45 has a pin surface center 47 which is also substantially the center of the adjustable locating pin 18. The cam surface 46 has a cam surface center 48. The cam surface center 48 is eccentric from the pin surface center 47 and provides for the middle portion of cam surface 46, generated on the body portion 40, to be closer to the pin center surface 47 than the pin surface 45 is to the pin surface center 47. This is due to the fact that the cam radius 51 is larger than the pin radius 52 which forms the body portion 40 but short enough to act between the pin surface center 47 and where the pin surface 45 would be if the cam surface 46 was not present. The portion of the cam surface 46 which is closest to the pin surface center 47 is its center point and is generally indicated as low point 54. A first high point 55 and a second high point 56 are defined where the cam surface 46 intersects with the pin surface 45. The pin radius 52 is substantially equal to the radius of bore 20 so that a snug or press fit can be provided when adjustably positioning the locating pin 18 in the bore 20. The full function and purpose of the adjustable locating pin 18 will be discussed in more detail below.

The cutting insert 22, as viewed in FIG. 7, has its cutting surfaces 24 and 26 acted upon the adjustable locating pin 18 and the locating bottom surface 17, respectively. The end wall 15 is the portion of the locating pin 18 which acts on the surface 24 as explained above. The cutting insert 22 has a front face surface 58 which is positioned juxtaposed to the side wall 16 and a back face surface 59 which is positioned juxtaposed the side wall 14.

The milling cutter has the locating pin 18 positioned in the bore 20 with its cam surface 46 and/or pin surface 47 acting as the end wall 15 for the cutting insert slot 12. The cam surface 46 and/or pin surface 47 can act on the face 24 of the cutting insert 22 to position a cutting tip 61, which is the intersection of cutting surfaces 32 and 33, at various cutting positions along a range of various predetermined cutting positions as desired. The scope of the cutting position range will increase as the cam radius 51 decreases with cam surface center 48 remaining as its center.

During assembly the milling cutter has the cutting insert 22 or a master blade insert positioned in the cutting insert slot 12. A maximum-in position is the position illustrated in FIG. 7 and a maximum-out position is represented by point 63. The positioning of point 63 is exaggerated to illustrate the principles of the adjustability provided by the present invention as will be explained in more detail below.

To position the cutting insert 22 so that the cutting tip 61 is at the maximum-in position, an assembler will place the locating pin 18 in the bore 20 and turn the pin so that the low point 54 will act on the surface 24. Surface 26 will be positioned on and located off of the locating bottom surface 17 which provides a solid base of support for the cutting insert 22 during the cutting operation. The assembler can locate the cutting insert 22 at any position along the locating bottom surface 17 by turning the locating pin 18 so that the portion of the cam surface 46 acting on the surface 26 will move from the low point 54 towards either the first high point 55 or the second high points 56. This will cause the cutting point 61 to move in the direction of arrow 64. The further the assembler rotates the locating pin 18, the further the cutting tip 61 will be moved from the center of the disc shaped rotatable body member 10 in the direction of arrow 64. When the surface 24 is acted upon by the first high point 55, the second high point 56 or some portion of the pin surface 45, the cutting tip 61 will then be at its maximum-out position illustrated by exaggerated point 63. The cutting positions between the maximum-in and the maximum-out position are provided in the direction of arrow 64 along a line projecting from the maximum-in to the maximum-out position in substantially a parallel line to the locating bottom surface 17.

In the preferred embodiment of the milling cutter illustrated in FIGS. 1 through 7, the cutting inserts 22 are securely held in position in their appropriate cutting insert slots by an adjustable wedging member 65, best viewed in FIG. 3, comprising a generally cylindrical body 66 which is disposed in an appropriate cavity 68 in the milling cutter body member 10. The cavity 68 provides a opening into side wall 14. The cylindrical body 66 of the wedge member 65 is provided with a threaded bore 69 which is aligned with a threaded bore 70 in said body member 10. Threaded bore 69 and threaded bore 70 have their threaded motion in opposite directions and are engaged with a threaded member 71. The threaded member 71 is provided with a first threaded portion 72 acting with threaded bore 69 and having a threaded motion in one direction and a second threaded portion 74 acting with threaded bore 70 and having a threaded motion in an opposite direction, so that rotation of the threaded member 71 in one direction drives the cylindrical body 66 into the cavity 68. The cylindrical body 66 is provided with an angular flat outer surface 75 defining part of the side wall 14 of the cutting insert slot 12 and opposite to the side wall 16. The angular flat outer surface 75 acts on the back face surface 59 of cutting insert 22. It can thus be seen that by rotating the threaded member 71 in one direction the cutting insert 22 is locked securely in position in the cutting insert slot 12 due to the wedgeing action of the wedge member 65 acting on the back face surface 59 moving the front face surface 58 into securing contact with the side wall 16 of cutting insert slot 12 and rotating the threaded member 71 in the opposite direction releases the cutting insert 22 from cutting insert slot 12. The action of wedge member 65 on cutting insert 22 also tends to provide firm contact between end wall 15 and locating bottom surface 17 with locating surfaces 24 and 26, respectively.

Hollow concave shallow recesses 77 and 78 are provided on the disc shaped rotatable body member 10 out of portions of the face surface 28 and the angular surface 30, respectively, to afford a clearance for the chips removed from a workpiece acted on by the milling cutter by the cutting edges of cutting surfaces 32 and 33 of each of the cutting inserts 22 during a machining operation. Depending upon the shape and form of the dis-shaped rotatable body member 10, the recesses 77 and 78 could be provided from various combinations of milling cutter surfaces 28, 29 and 30.

The adjustable wedging member 65 for securing the cutting inserts 22 in their cutting insert slots 12 could accomplish their function by being positioned on either side of the cutting insert slot 12. If it is positioned on the front face surface 58 side, the top surface of the adjustable wedging member 65 could provide part or all of the hollow concave shallow recesses 77 and 78.

Referring generally to FIG. 8, we have illustrated a locating pin 18' which has a uniform cylindrical pin surface 45' with no provisions for adjustment of the cutter insert 22's cutting position. In this application the locating pin 18' will be precisely machined to a predetermined diameter and will act in conjunction with the cutting insert 22 to position it to a single predetermined position on the locating bottom surface 17 which will give an accurate and precise position on the milling cutter. This requires precise machining of all the relative parts of the milling cutter as it is being produced.

In a normal procedure the milling cutter could be set up using either master milling blades or sample cutting inserts 22 at the point of assembly before being sent out to the ultimate consumer; thus, the locating pins 18 or 18' would be set at the point of assembly and then the master milling blades would be removed after the locating pins 18 or 18' were accurately placed in their bores 20. The adjustable top ends 42 of the locating pins 18 or 18' would be cut off at this time and their remaining end portions extending above the surface of the disc shaped rotatable body member 10 would be machined to make them flush with their various associated surfaces.

It can be seen from the above description of the invention that simple and inexpensive, yet practical and durable means have been disclosed for obtaining the desirable ends. Attention is again invited, however, to the possibility of making variations within the spirit and scope of the invention set forth. Also, direction terms such as maximum-in, maximum-out, etc. have been used to facilitate explaining the invention in the position and embodiment shown in the drawings and are not to be considered as limiting the spirit and scope of the invention.

Other modes of applying the principles of my invention may be employed, instead of those explained, change being made as regards the article in combination herein disclosed, provided the means stated be any of the following claims or the equivalent of such stated means be employed.

I, therefore, particularly point out and distinctively claim as my invention:

1. A cutting insert positioned in a body holder, including in combination:
   (a) a pair of side walls spaced apart and substantially parallel to each other and connected by a locating bottom surface;
   (b) said side walls and said locating bottom surface forming a cutting insert slot;
   (c) said cutting insert slot having substantially open end portions;
   (d) an end bore positioned at one end of said cutting insert slot to form one open end portion;
   (e) a locating pin positioned in said bore;
   (f) said locating pin having an outer surface forming an end wall as part of said cutting insert slot;
   (g) said locating pin and said locating bottom surface acting on adjacent sides of said cutting insert to precisely position said cutting insert in said body holder;
   (h) securing means to secure said cutting insert in said cutting insert slot;
   (i) said locating pin having an adjustable means to position said cutting insert over a predetermined range of cutting positions with respect to said locating bottom surface;
   (j) said locating pin being substantially circular in cross-section and having an outer pin surface;
   (k) said outer pin surface having an outer pin surface center with an axial position substantially the same as the axial position of said end bore; and
   (l) said locating pin having an adjustable surface as part of said adjustable means which is circular in cross-section and having a center different than said outer pin surface center and a radius larger than the radius of its said outer pin surface.

2. A cutting insert positioned in a body holder as defined in claim 1, including in combination:
   (a) said locating pin having an adjustable top end; and
   (b) said adjustable top end having adjusting flats which can be acted on to position said adjustable surface at a predetermined position.

3. A cutting insert positoned in a body holder as defined in claim 2, including in combination:
   (a) a cavity bore positioned adjacent to one of said side walls and forming an opening in said side wall;
   (b) said securing means including a wedging member positioned in said cavity bore;
   (c) said wedge member having a first threaded bore;
   (d) said body holder having a second threaded bore aligned with said first threaded bore;
   (e) a threaded member having first and second threaded portions threaded in opposite directions to each other;
   (f) said threaded member positioned in said first threaded bore and said second threaded bore;
   (g) said wedge member acting on said cutting insert to secure it against the opposite side wall; and
   (h) said wedge member securely locating said cutting insert off said end wall and said locating bottom surface when said threaded member is turned in a securing direction.

4. A milling cutter having a disc shaped rotatable body member, including in combination:
   (a) at least two pairs of side walls spaced apart and substantially parallel to each other and connected by locating bottom surfaces;
   (b) said side walls and said locating bottom surfaces forming cutting insert slots;
   (c) bore surfaces at one end of said side walls forming open end portions;
   (d) solid locating pins positioned in said bore surfaces;
   (e) cutting inserts positioned in said cutting insert slots;
   (f) said cutting inserts precisely positioned off of said locating pins and said locating bottom surfaces;
   (g) securing means to secure said cutting inserts in said cutting insert slots;
   (h) said locating pins having adjustable means to position said cutting inserts over a predetermined range of cutting positions with respect to said locating bottom surfaces;
   (i) said solid locating pins having outer pin surfaces;
   (j) said outer pin surfaces having adjustable surfaces and pin surfaces;
   (k) said pin surfaces having circular cross-sections and pin surface centers with axial positions substantially the same as the axial positions of said bore surfaces;
   (l) said adjustable surfaces having circular cross-sections and having adjustable surface centers different from said pin surface centers; and
   (m) said adjustable surfaces having larger radii than the radii of said pin surfaces.

5. A milling cutter as defined in claim 4, including in combination:
   (a) said locating pins having adjustable top ends; and
   (b) said adjustable top ends having adjusting flats which can be acted on to position said adjustable surfaces at predetermined positions.

6. A milling cutter as defined in claim 5, including in combination:
   (a) cavity bores positioned adjacent to one of said side walls of each pair and forming an opening in said side walls;
   (b) said securing means including wedging members positioned in said cavity bores;
   (c) said wedge members having first threaded bores;
   (d) said body holder having second threaded bores aligned with said first threaded bores;
   (e) threaded members having first and second threaded portions threaded in opposite directions to each other;
   (f) said threaded members positioned in said first threaded bores and said second threaded bores;
   (g) said wedge members acting on said cutting inserts to secure them against the opposite side wall; and
   (h) said wedge member securely locating said cutting inserts off said end walls and said locating bottom surfaces when said threaded members are turned in a securing direction.

7. A milling cutter as defined in claim 6, including in combination:
   (a) said locating bottom surfaces are in planes forming acute angles with the axis of said rotatable body member.

References Cited
UNITED STATES PATENTS
| | | | |
|---|---|---|---|
| 3,195,376 | 7/1965 | Bader | 29—105 X |
| 3,339,257 | 9/1967 | Hargreaves et al. | 29—105 |

FOREIGN PATENTS
| | | |
|---|---|---|
| 933,613 | 8/1963 | Great Britain. |
| 84,512 | 1/1965 | France. |
| 596,664 | 8/1959 | Italy. |

HARRISON L. HINSON, Primary Examiner